(12) United States Patent
Park et al.

(10) Patent No.: US 6,902,839 B2
(45) Date of Patent: Jun. 7, 2005

(54) POLYMER ELECTROLYTE MEMBRANE FOR FUEL CELL AND METHOD FOR PRODUCING THE SAME

(75) Inventors: Jung Ki Park, Daejeon (KR); Young Gi Lee, Taejeon (KR); Ji Yong Eom, Taejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 271 days.

(21) Appl. No.: 10/159,744

(22) Filed: May 31, 2002

(65) Prior Publication Data

US 2003/0224235 A1 Dec. 4, 2003

(51) Int. Cl.$^7$ ................................................ H01M 8/10
(52) U.S. Cl. .............................. 429/33; 429/40; 429/42
(58) Field of Search .............................. 429/33, 40, 42, 429/142, 148, 163, 309

(56) References Cited

U.S. PATENT DOCUMENTS

| | | | |
|---|---|---|---|
| 5,360,679 A | 11/1994 | Buswell et al. | |
| 5,547,551 A | 8/1996 | Bahar et al. | |
| 5,656,386 A | * | 8/1997 | Scherer et al. ................ 429/23 |
| 5,766,787 A | * | 6/1998 | Watanabe et al. ............. 429/33 |
| 5,798,188 A | | 8/1998 | Mukohyama et al. |
| 6,383,676 B1 | | 5/2002 | Akiyama et al. |
| 6,387,558 B1 | | 5/2002 | Mizuno et al. |
| 6,391,486 B1 | | 5/2002 | Narayanan et al. |
| 2002/0127454 A1 | * | 9/2002 | Narang et al. ................ 429/33 |

* cited by examiner

*Primary Examiner*—Dah-Wei Yuan
(74) *Attorney, Agent, or Firm*—Roberts, Abokhair & Mardula, LLC

(57) ABSTRACT

Disclosed is a polymer electrolyte membrane for a fuel cell, which restrains a crossover phenomenon of fuel and a decomposition of a polymer membrane over platinum, and shows outstanding power output and performance characteristics during operation of the fuel cell, and a method for producing the same. The method comprises the steps of blending a polymer matrix with a fluorinated ionomer of 3 to 50 wt % based on a weight of a polymer to produce a blended polymer solution; casting the blended polymer solution into a polymer membrane; and coating the fluorinated ionomer on both sides of the polymer membrane to produce a composite membrane. The polymer electrolyte membrane has advantages in that the fuel cell using the polymer electrolyte membrane, which has high energy efficiency, can be inexpensively produced, and so the fuel cell can be applied in various applications such as a power source of a nonpolluting car, on-site generation of electricity, an electric power source of a spacecraft, a portable energy source, and an energy source for military purpose.

11 Claims, 3 Drawing Sheets

POLYMER ELECTROLYTE MEMBRANE FOR FUEL CELL AND METHOD FOR PRODUCING THE SAME

BACKGROUND

The present invention provides improved polymer electrolyte membranes for fuel cell applications and methods for producing the same and, in particular, to polymer electrolyte membranes for fuel cells. The membranes restrain crossover phenomenon of fuel and decomposition reaction of polymer membranes over platinum. Further, the membranes show outstanding power output and performance characteristics during operation of a fuel cell. A method for producing the membranes is also provided.

In our time, energy is a requisite and its importance continues to increase. Energy has been mostly obtained from fossil fuels, nuclear power generation, and water power generation. However, recently, many efforts have been made to develop technologies for effectively utilizing limited energy sources and exploiting various alternative energy sources because of depletion of natural energy sources and increase of environmental concerns. In addition, advanced countries have focused on these technologies to take the initiative in the future of the energy industry.

A fuel cell meeting the above needs is one of the future energy sources now in the spotlight. The fuel cell is a kind of D.C. generator (direct current generator) directly transforming chemical energy into electrical energy by an electrode reaction, and has a high energy efficiency. The fuel cell is not limited by a Carnot cycle, as well as hardly causing problems of noise, vibration, and waste gas. In addition, the fuel cell is advantageous in that the fuel cell can continuously generate electric power if fuel and oxidants are continuously provided, while first and secondary cells store a limited supply of energy and for its operation. Recently, there has been actively studied a fuel cell as a high efficiency energy source in USA, Europe, Canada, and Japan, and it is expected that the fuel cell will soon be commercialized as an effective alternative energy source.

Fuel cells are classified into various groups including polymer electrolyte fuel cells (PEFC) or proton exchange membrane fuel cells (PEMFC), alkali fuel cells (AFC), phosphoric acid fuel cells (PAFC), molten carbonate fuel cells (MCFC), and solid oxide fuel cells (SOFC). The classifications are usually made according to operating temperatures and classes of electrolytes.

The various types of fuel cells and components employed therein are well known in the art. For example, U.S. Pat. No. 5,798,188 to Mukohyama et al is directed to a polymer electrolyte membrane fuel cell with bi-polar plate having molded polymer projections. U.S. Pat. No. 6,383,676 to Akiyama et al is directed to polymer electrolyte fuel cell devices with features that prevent the polymer electrolyte membrane from drying. U.S. Pat. No. 5,360,679 to Buswell et al is directed to hydrocarbon-fueled solid polymer fuel cell electric power generation systems to produce utility-grade electrical power. U.S. Pat. No. 6,387,558 to Mizuno et al is directed to fuel cells with separators for the distribution of gas in the fuel cell. U.S. Pat. No. 5,547,551 to Bahar et al is directed to ultra-thin integral composite membranes for fuel cells. U.S. Pat. No. 6,391,486 to Narayanan et al is directed to an improved direct liquid-feed fuel cell having a solid membrane electrolyte. These references are incorporated herein in their entirety and provide background for the various types and components of fuel cells.

Among these various types of fuel cells, polymer electrolyte fuel cells mostly use a Nafion® polymer membrane having hydrogen ion conductive property as an electrolyte. The advantages of PEFCs include low operation temperature, high efficiency, high currency density and output density, short starting time, and fast response to load change, in comparison with other types of fuel cell. In addition, the polymer electrolyte fuel cell is not eroded and strict control of the electrolyte is not needed because the polymer membrane is used as the electrolyte. Further, conventional established technology utilizing a methanol reformer can be applied to this type of fuel cell. Other advantages of a polymer electrolyte fuel cell are that it is not sensitive to pressure changes of reacting gas, it can be easily produced because its structure is simple, and a fuel cell stack can be made of various materials. Furthermore, volume and weight of the polymer electrolyte fuel cell are smaller than the phosphoric acid fuel cell having the same operating principle as the polymer electrolyte fuel cell, and the polymer electrolyte fuel cell can be used in applications such as a power source of a nonpolluting car, on-site generation of electricity, an electricity source of a spacecraft, a portable energy source, and an energy source for military purposes, because it can generate various ranges of power.

However, the polymer electrolyte fuel cell is disadvantageous in that waste heat cannot be utilized and the polymer electrolyte fuel cell cannot be used in conjunction with a reformer operated at high temperature. Because the polymer electrolyte fuel cell is operated at low temperature, a maximum limit of carbon dioxide content in reaction gas is low because platinum is used as an electrode catalyst. Catalyst content should be very low in order to reduce production cost of the polymer electrolyte fuel cell. Particularly, a nafion polymer membrane used as the electrolyte is very expensive, and it is difficult to control moisture content in the polymer membrane during operation of the fuel cell.

In the case of a polymer electrolyte fuel cell using a polymer membrane as the electrolyte, the contact surface between the electrolyte and a catalyst in the electrode is small in comparison with other fuel cells using a liquid electrolyte, thereby a large quantity of catalyst is needed.

The nafion polymer membrane is a kind of perfluorinated ionomer membrane, taking the shape of a transparent film with a thickness of about 150 $\mu$m. It has an equivalent weight of about 1100, and when it is hydrated, it has a high hydrogen ionic conductivity of $10^{-2}$ S/cm or higher. However, the nafion polymer membrane is relatively thick, and so an output characteristic of the polymer electrolyte fuel cell is poor during operation of the fuel cell, a crossover problem of fuel occurs when methanol is used as fuel, and the ionic conductivity of the nafion polymer membrane is sensitive to temperature and relative humidity. In addition, when the nafion polymer membrane is used at a relatively high temperature, it is thermally deformed, and so the nafion polymer membrane does not come into sufficient contact with the electrode, thereby performance of the polymer electrolyte fuel cell is seriously reduced.

SUMMARY OF THE INVENTION

Therefore, the object of the present invention is to provide a polymer electrolyte membrane for a fuel cell, which has improved mechanical properties and thermal deformation characteristics when compared to a conventional nafion membrane and shows hydrogen ion conductivity as excellent as the conventional nafion while being very thin in comparison with the conventional nafion. A method is provided for producing the polymer electrolyte membrane for the fuel cell.

In accordance with one embodiment of the present invention, methods for producing a polymer electrolyte membrane for a fuel cell are provided. A method comprises blending a polymer matrix with a fluorinated ionomer in an amount of 3 to 50 wt % of the polymer matrix, to produce a blended polymer solution. The blended polymer solution is cast into a polymer membrane. The fluorinated ionomer is used as a coating on both sides of the polymer membrane to produce a composite membrane.

In accordance with another embodiment of the present invention, improved polymer electrolyte membranes for a fuel cell are provided. The membrane comprises a core layer of blended polymer matrix with a fluorinated ionomer in an amount of 3 to 50 wt % of the polymer matrix. The membrane is coated on both sides with a fluorinated ionomer to produce a composite membrane.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PRESENT INVENTION

Figure 1:
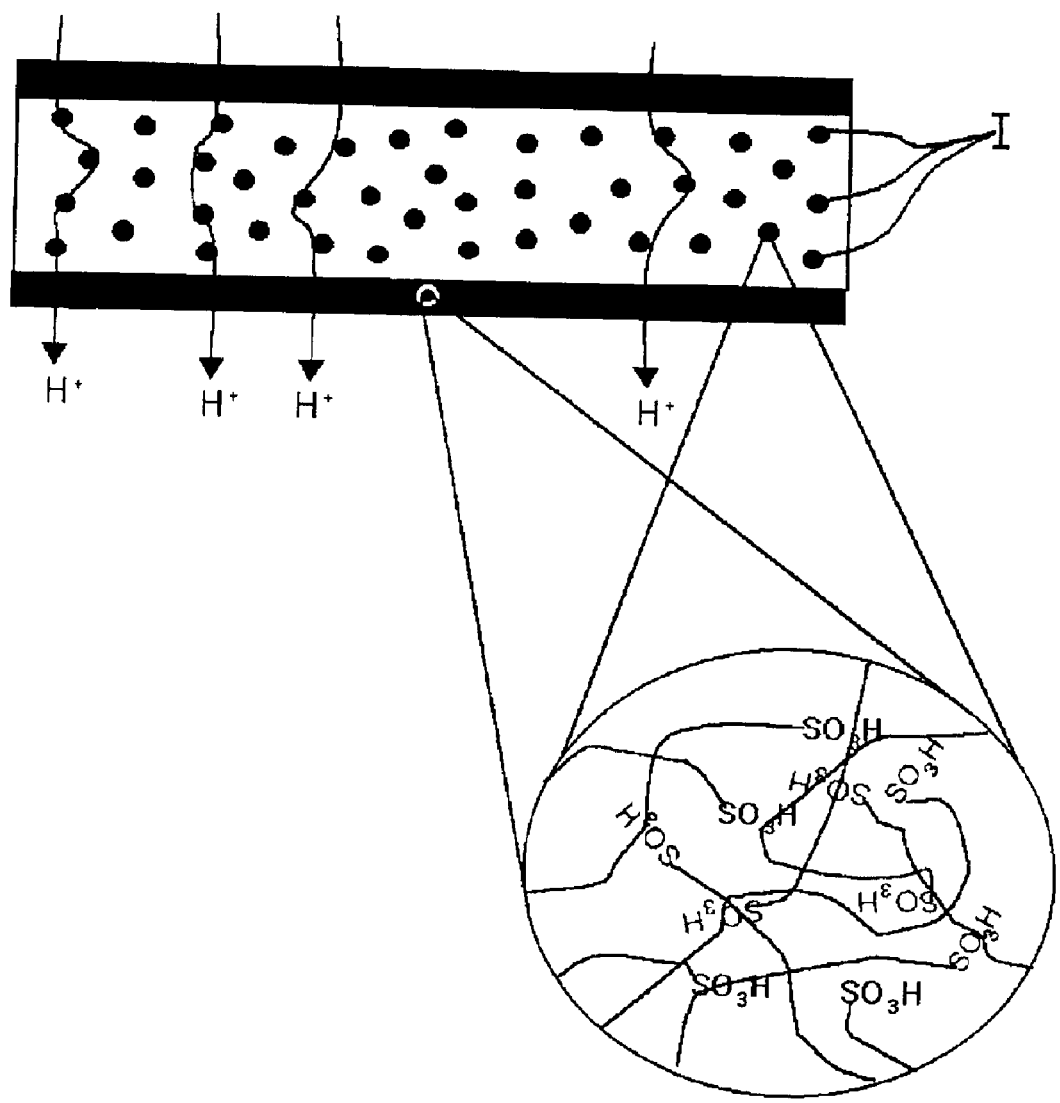
FIG. 1 is a sectional view of a polymer electrolyte membrane according to one embodiment of the present invention.

In accordance with one embodiment, the present invention provides methods for producing a polymer electrolyte membrane for a fuel cell. One method comprises the steps of blending a polymer matrix with a fluorinated ionomer in an amount of 3 to 50 wt % of the polymer matrix, to produce a blended polymer solution. The blended polymer solution is cast into a polymer membrane. The membrane is coated on both sides with a fluorinated ionomer to produce a composite membrane.

The polymer matrix is at least one selected from the group comprising polyethylene, polypropylene, polysulfone, polyimide, polyvinylidene fluoride, polyurethane, polystyrene, polyvinylchloride, cellulose, nylon, copolymers of monomers thereof, and blends thereof; a copolymer of vinylidenefluoride and hexafluoropropylene; a copolymer of vinylidenefluoride and trifluoroethylene; a copolymer of vinylidenefluoride and tetrafluoroethylene; acrylate based polymer such as polymethylacrylate, polyethylacrylate, polymethyl methacrylate, polyethylmethacrylate, polybutylacrylate, polybutylmethacrylate, polyacrylonitrile, polyvinylacetate, polyethyleneoxide, polypropyleneoxide, copolymers of monomers thereof, and blends thereof.

The blended polymer solution is produced by blending the fluorinated ionomer with the polymer matrix. At this time, the fluorinated ionomer is preferably a perfluorinated or partially fluorinated ionomer.

In addition, it is preferable that inorganic material is further added to the blended polymer solution in an amount of 50 wt % or less based on the weight of the polymer. The inorganic material is preferably at least one selected from the group of aluminum oxide, lithium aluminum oxide, silica, zeolite, talc, titanium oxide, tungsten phosphoric acid hydrate, and molybdenum phosphoric acid hydrate.

To produce a polymer electrolyte membrane of the present invention, fluorinated ionomer is added to polymer used as a polymer matrix in an amount of 3 to 50 wt % based on the weight of the polymer. For example, when the amount of the fluorinated ionomer is less than 3 wt %, hydrogen ion conductivity of the polymer electrolyte membrane becomes low. On the other hand, when the amount is more than 50 wt %, mechanical properties of the polymer electrolyte membrane become poor.

The fluorinated ionomer is blended with the polymer matrix as a type of solution, powder, or film.

Inorganic acid hydrates which readily absorbs moisture and can provide hydrogen ions are optionally added to the resulting polymer matrix in amounts of 50 wt % or less. The resulting polymer solution is cast into a polymer film. When the amount of the inorganic acid hydrate added to the polymer matrix is 50 wt % or more, mechanical properties of the polymer electrolyte membrane become poor. The polymer film is 50 to 100 $\mu$m in thickness. Thereafter, the fluorinated ionomer is optionally coated on both sides of the polymer electrolyte membrane to produce the composite membrane with a thickness of 60 to 110 $\mu$m. The composite membrane thus produced is pressed and subjected to lamination by a laminator so that the thickness of the composite membrane is 10 to 50 $\mu$m.

A better understanding of the present invention may be obtained in light of the following examples which are set forth to illustrate, but are not to be construed to limit the present invention.

EXAMPLE 1

A nafion solution (5 wt %), which is one of perfluorinated ionomers, was added to a solution of a copolymer of vinylidenefluoride and hexafluoropropylene in a weigh ratio of 9:1. Then, tungsten phosphoric acid hydrate, which is an inorganic material, was added to the resulting mixture in an amount of 30 wt % based on the polymer matrix, and is cast to produce a polymer membrane with a thickness of 60 $\mu$m. Both sides of a support membrane thus produced are coated with 5 wt % nafion solution to produce the composite membrane with a thickness of 70 $\mu$m. The composite membrane thus produced is pressed and laminated so that the thickness of the composite membrane is 30 $\mu$m. Micro pores formed during production of the matrix membrane are removed by lamination. The resulting composite membrane thus produced is attached to a stainless steel electrode, and sealed by an aluminum casing coated with polyethylene. After that, hydrogen ion conductivity of the resulting composite membrane is measured with increasing of temperature.

EXAMPLE 2

The procedure of example 1 was repeated except that the copolymer of vinylidenefluoride and hexafluoropropylene was blended with nafion in a weight ratio of 8:2.

EXAMPLE 3

The procedure of example 1 was repeated except that the copolymer of vinylidenefluoride and hexafluoropropylene was blended with nafion in the weight ratio of 7:3.

EXAMPLE 4

The procedure of example 1 was repeated except that polyethylene was used as the polymer matrix instead of the copolymer of vinylidenefluoride and hexafluoropropylene.

EXAMPLE 5

The procedure of example 1 was repeated except that polypropylene was used as the polymer matrix instead of the copolymer of vinylidenefluoride and hexafluoropropylene.

EXAMPLE 6

The procedure of example 1 was repeated except that polysulfon was used as the polymer matrix instead of the copolymer of vinylidenefluoride and hexafluoropropylene.

EXAMPLE 7

Impregnation characteristics of the composite membranes according to examples 1 to 6 in methanol solutions were observed in order to evaluate an improvement in the methanol crossover of each composite membrane. The extent of impregnation of the composite membrane with the methanol solution was calculated as a weight of methanol absorbed in the composite membrane based on the weight of the pure composite membrane.

Figure 2:
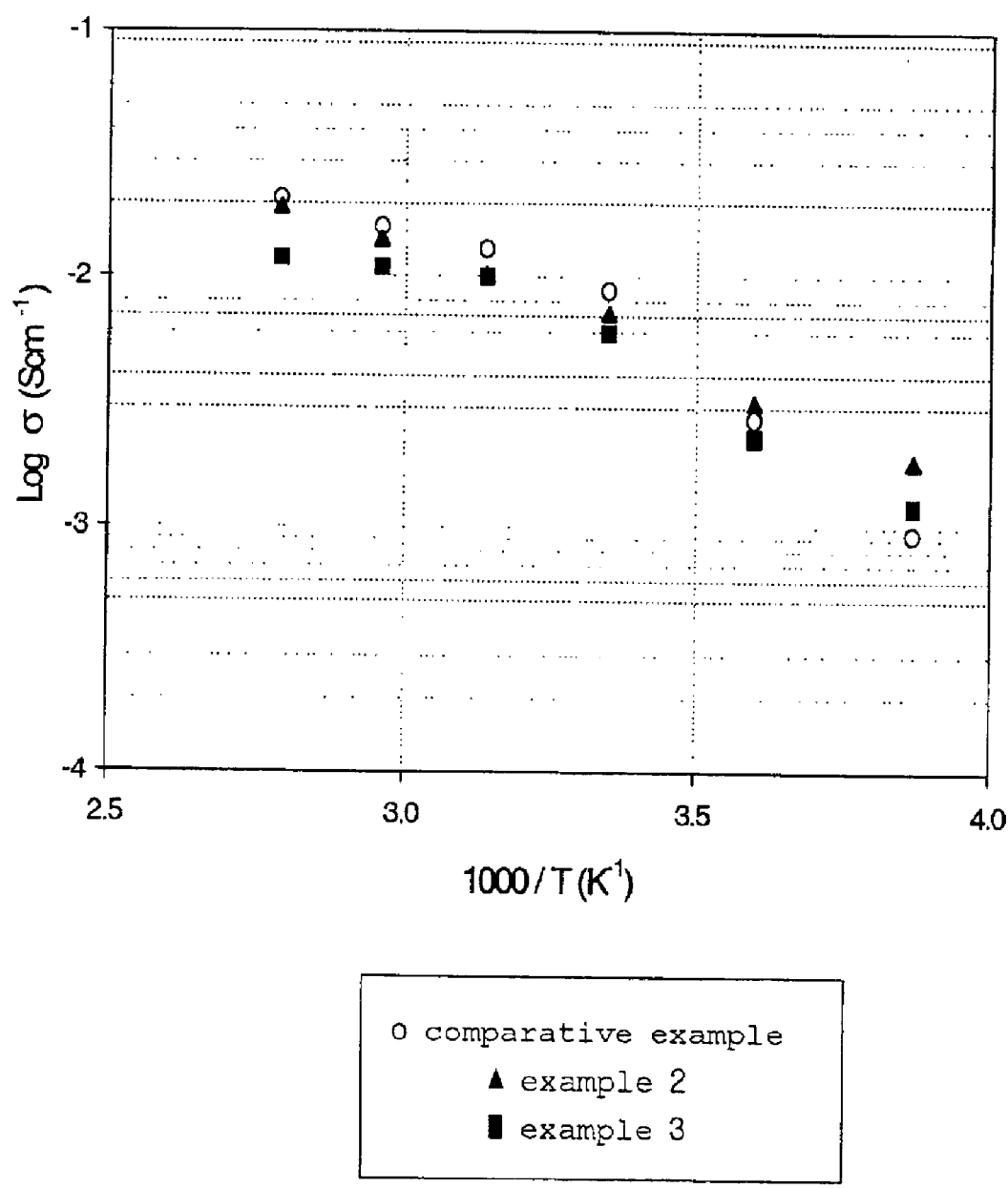
FIG. 2 is a graph showing ionic conductivity as a function of temperature of a polymer electrolyte membrane made according to one embodiment of the present invention.
Figure 3:
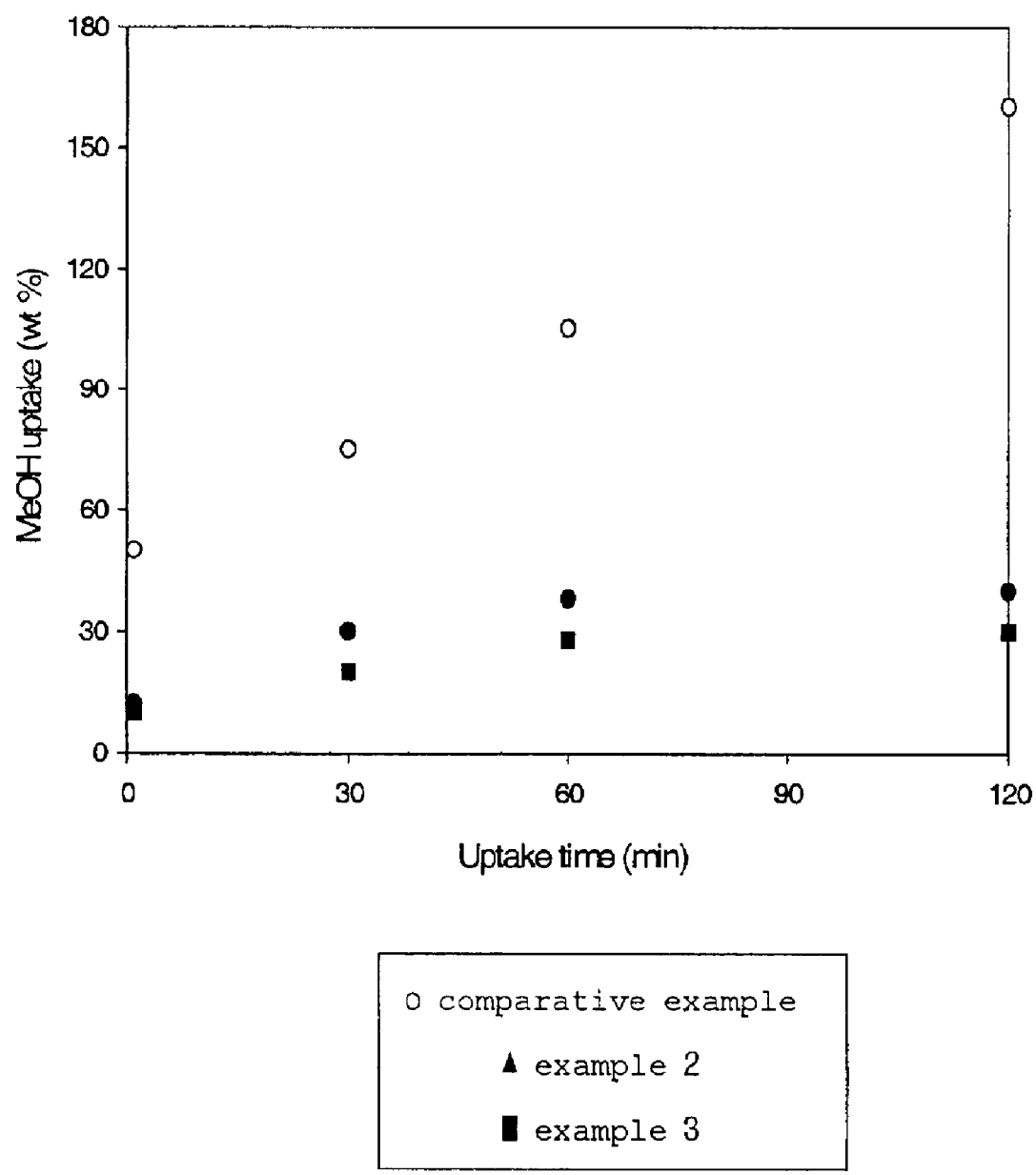
FIG. 3 is a graph showing MeOH content in a polymer electrolyte membrane as a function of impregnation time of the polymer electrolyte membrane impregnated with MeOH.

Evaluation results are given in Table 1, and plotted in FIGS. 2 and 3, in conjunction with those of comparative example.

TABLE 1

| Examples | composite membrane Thick. ($\mu$m) | Moisture content (wt %) | Ion conductivity (S/cm), 25 ° C. |
|---|---|---|---|
| 1 | 30 | 20 | $6.3 \times 10^{-3}$ |
| 2 | 29 | 22 | $7.1 \times 10^{-3}$ |
| 3 | 31 | 23 | $8.1 \times 10^{-3}$ |
| 4 | 30 | 16 | $5.1 \times 10^{-3}$ |
| 5 | 31 | 18 | $5.6 \times 10^{-3}$ |
| 6 | 30 | 17 | $5.9 \times 10^{-3}$ |
| Co. Ex. | 180 | 28 | $8.7 \times 10^{-3}$ |

Form the results shown in Table 1, it can be seen that a hydrogen ion conductive membrane according to the present invention has a moisture content of 20% or so, which is almost same hydrogen ion conductivity as the conventional nafion, even though perfluorinate based ionomer is introduced into a part of or a surface of the matrix. Particulary, composite membranes according to examples of the present invention are reduced by ⅕ or less in thickness, in comparison with the comparative example, and so when the composite membrane according to the present invention is combined with an electrode to produce a fuel cell, the fuel cell shows high output characteristics. A fuel cell made in accordance with the present invention has a better performance than the fuel cell using conventional nafion (comparative example).

With reference to FIG. 1, a sectional view of a polymer electrolyte membrane according to the present invention is illustrated. Micro phase separation regions I consisting of perfluorinated based ionomers are widely distributed in the polymer matrix, and so hydrogen ions are mostly conducted through the micro phase separation regions I. In addition, the non-porous hydrophobic polymer matrix prevents a crossover phenomenon of polar liquid such as methanol, or gas fuel such as hydrogen, through the membrane to an opposite electrode.

According to the present invention, nafion coated on the surface of the membrane improves hydrogen ion conductivity at an interface between the membrane and the electrode, and restrains a decomposition reaction of hydrogen atoms on the surface of the platinum by preventing the platinum catalyst from directly contacting the non-fluorinated polymer matrix. Furthermore, nafion acts as an adhesive layer, and so the polymer membrane sufficiently contacts an electrode active material, a three phase interface is easily formed when nafion is hydrated, and catalyst efficiency becomes high.

Referring to FIG. 2, a graph showing ion conductivities as a function of temperature of the polymer electrolyte membrane according to examples 2 and 3 of the present invention is illustrated. The polymer electrolyte membrane contains 20 wt % moisture based on the weight of the polymer, and has an excellent low temperature characteristic of −15° C. as well as an excellent ion conductivity of about $10^{-2}$ S/cm, thereby it can be seen that the polymer electrolyte membrane according to the present invention has almost the same ion conductivity as nafion according to the comparative example, consisting of perfluorinated based ionomers.

Turning now to FIG. 3, a graph showing MeOH content in the polymer electrolyte membrane as a function of impregnation time of the polymer electrolyte membrane impregnated in MeOH is illustrated. From the graph, it can be confirmed how the crossover phenomenon of the polymer electrolyte membrane is restrained. Because nafion is partially distributed as a type of micro phase in the hydrophobic matrix, the crossover phenomenon of methanol is greatly reduced in comparison with the case of nafion according to the comparative example. Therefore, the polymer composite membrane according to the present invention is useful as the polymer membrane for a polymer electrolyte fuel cell.

As described above, perfluorinated ionomers are uniformly dispersed in the polymer matrix of the present invention as a type of micro phase, and hydrogen ions are conducted through the perfluorinated hydrogen ionomer. Furthermore, perfluorinated ionomers coated on both sides of the matrix are in contact with a platinum catalyst to form a three phase interface, restrain decomposition of the membrane, and easily increase an activity of the catalyst.

Therefore, the present invention has advantages in that when the polymer electrolyte membrane is used to produce a fuel cell as an alternative energy source, it can be inexpensively produced and has an excellent output and performance characteristic in comparison with the conventional nafion, thereby the fuel cell of the present invention can be applied in various applications, such as a power source of a nonpolluting car, on-site generation of electricity, an electric power source of a spacecraft, a portable energy source, and an energy source for military purposes, and can contribute to national energy self-sufficiency, substitute for imported energy resources, and be available as an energy resource for export.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for producing a polymer electrolyte membrane for a fuel cell, comprising the steps of:

blending a polymer matrix with a fluorinated ionomer in an amount of 3 to 50 wt % of the polymer matrix, to produce a blended polymer solution;

casting the blended polymer solution into a polymer membrane;

coating the fluorinated ionomer on both sides of the polymer membrane to produce a composite membrane; and laminating the composite membrane to produce a composite membrane with a thickness of 10 to 50 µm.

2. The method according to claim 1, wherein the polymer matrix is at least one selected from the group consisting of polyethylene, polypropylene, polysulfone, polyimide, polyvinylidenefluoride, polyurethane, polystyrene, polyvinylchloride, cellulose, nylon, copolymers of monomers thereof, and blends thereof a copolymer of vinylidenefluoride and hexafluoropropylene; a copolymer of vinylidenefluoride and trifluoroethylene; a copolymer of vinylidenefluoride and tetrafluoroethylene; and acrylate based polymer, polyacrylonitrile, polyvinylacetate, polyethyleneoxide, polypropyleneoxide, copolymers of monomers thereof, and blends thereof.

3. The method according to claim 1, wherein the fluorinated ionomer is a perfluorinated or partially fluorinated ionomer.

4. The method according to claim 1, wherein inorganic material is further added to the blended polymer solution in an amount of 50 wt % or less based on the weight of the polymer.

5. The method according to claim 4, wherein the inorganic matter is at least one selected from the group consisting of aluminum oxide, lithium aluminum oxide, silica, zeolite, talc, titanium oxide, tungsten phosphoric acid hydrate, and molybdenum phosphoric acid hydrate.

6. The method according to claim 1, wherein the fluorinated ionomer is in a solution state when being blended with the polymer matrix.

7. The method according to claim 1, wherein the fluorinated ionomer is in a powder state when being blended with the polymer matrix.

8. The method according to claim 1, wherein the fluorinated ionomer is in a film state when being blended with the polymer matrix.

9. A polymer electrolyte membrane for a fuel cell produced according to claim 1, wherein the polymer electrolyte membrane is substantially free of micropores.

10. A method for producing a polymer electrolyte membrane for a fuel cell, comprising the steps of:

blending a polymer matrix with a fluorinated ionomer in an amount of 3 to 50 wt % of the polymer matrix, and inorganic material in an amount not greater than 50 wt % based on the weight of the polymer, to produce a blended polymer solution;

casting the blended polymer solution into a polymer membrane;

coating the fluorinated ionomer on both sides of the polymer membrane to produce a composite membrane; and laminating the composite membrane.

11. A polymer electrolyte membrane for a fuel cell produced according to claim 10, wherein the polymer electrolyte membrane is substantially free of micropores.

* * * * *